United States Patent [19]
Perea

[11] Patent Number: 5,957,415
[45] Date of Patent: Sep. 28, 1999

[54] DEVICE FOR FIXING AT LEAST ONE FLUID PIPE TO A SUPPORT

[75] Inventor: Cyrille Perea, Montargis, France

[73] Assignee: Hutchinson, Paris, France

[21] Appl. No.: 08/987,262

[22] Filed: Dec. 9, 1997

[30] Foreign Application Priority Data

Dec. 22, 1996 [FR] France .................................. 96 15282

[51] Int. Cl.⁶ .................................................. E21F 17/02
[52] U.S. Cl. ............................................ 248/58; 248/68.1
[58] Field of Search ............................... 248/58, 55, 68.1, 248/634, 560, 686, 635, 49; 138/108, 112, 113

[56] References Cited

U.S. PATENT DOCUMENTS

| | | | |
|---|---|---|---|
| 1,881,913 | 10/1932 | Parker | 138/111 |
| 2,361,943 | 11/1944 | Issoglio et al. | 174/135 |
| 3,107,890 | 10/1963 | Parks | 267/183 |
| 4,116,411 | 9/1978 | Masuda | 248/60 |
| 4,550,795 | 11/1985 | Teshima | 180/296 |
| 4,746,104 | 5/1988 | Porbst | 267/140.1 |
| 4,844,401 | 7/1989 | Tenniswood | 248/635 |
| 5,301,907 | 4/1994 | Julian | 248/74.1 |

FOREIGN PATENT DOCUMENTS

| | | |
|---|---|---|
| 638756 | 2/1995 | European Pat. Off. . |
| 1519403 | 2/1968 | France . |
| 2032655 | 1/1971 | Germany . |
| 4406574 | 12/1995 | Germany . |

*Primary Examiner*—Ramon O. Ramirez
*Assistant Examiner*—Anita M. King
*Attorney, Agent, or Firm*—Alston & Bird LLP

[57] ABSTRACT

A device for fixing one or more rigid pipes to a rigid support comprises a block of rubber or elastomer overmolded on the pipes and on a fixing tab which is spaced apart from the pipes by a thickness of rubber or elastomer that prevents vibration and noise being transmitted. The invention is particularly applicable to fixing high pressure fluid pipes in a motor vehicle.

15 Claims, 1 Drawing Sheet

DEVICE FOR FIXING AT LEAST ONE FLUID PIPE TO A SUPPORT

FIELD OF THE INVENTION

The invention relates to a device for fixing at least one fluid pipe to a support, in particular a rigid pipe, e.g. made of metal, to a rigid support, e.g. made of metal.

The invention is particularly, but not exclusively, applicable to fixing pipes in the hydraulic circuit of power steering for a motor vehicle, and to fixing brake pipes, air conditioning pipes, oil pipes, or fuel pipes.

BACKGROUND OF THE INVENTION

The rigid pipes in the hydraulic circuit of power steering for a motor vehicle include metal tubes which are fixed to the engine block via metal tabs each having a portion that is generally brazed or welded to the metal tubes and another portion that includes a hole for receiving a screw or a bolt for fixing to the engine block.

Fixing such tabs to the metal tubes is relatively difficult and expensive, with brazing or welding making it necessary to use the same metal for the tabs and the tubes, and such a metal-on-metal fixing transmits noise and vibration between the tubes and the support.

OBJECT AND SUMMARY OF THE INVENTION

The present invention seeks in particular to avoid the drawbacks of those known means.

An object of the invention is to provide a device for fixing a rigid pipe to a rigid support, the device constituting a filter which prevents vibration and noise being transmitted between the pipe and the support, and the device also being easier to implement and cheaper than the above-mentioned known means.

To this end, the invention provides a device for fixing at least one fluid pipe to a support, in particular a rigid pipe, e.g. made of metal, to a rigid support, e.g. made of metal, the device comprising at least one fixing tab having a portion embedded in a block of a material such as rubber or an elastomer overmolded on the above-mentioned pipe, said tab being spaced apart from the pipe inside the block by a thickness of the above-specified material, thereby preventing vibration and noise being transmitted from the pipe to the support.

It is easier and cheaper to fix the tab to the pipe by means of an overmolded block of rubber or elastomer than by brazing the fixing tab to the pipe. In addition, the rubber or elastomer of the overmolded block prevents or very greatly reduces the transmission of vibration and noise between the pipe and the fixing tab on the support. In particular, when the pipe forms a portion of the hydraulic circuit of a motor vehicle power steering system, characteristic vibration and noise as generated in the power steering circuit is no longer transmitted to the support, thus making it possible to fix the pipes of the circuit on an element of the structure of the vehicle instead of fixing it to the engine block as is usually done, and that can make it simpler to fix such pipes in the engine compartment, whereas in the past such fixing was impossible or had to be avoided because of the large amount of noise and vibration that found its way into the vehicle.

Another advantage of the fixing device of the invention is that the overmolded block of rubber or elastomer is smaller and more compact than are known devices, and this is particularly advantageous when fixing pipes in an engine compartment.

Also, the block of rubber or elastomer can be molded over two different pipes thus making it possible not only to fix both pipes to a support by means of a single element, but also to position the pipes and to orient them relative to each other without any need to use additional means.

In particular, the two pipes can be constituted by a fluid go duct and by a fluid return duct, or by a high pressure pipe and a low pressure pipe, e.g. in a power steering circuit.

According to another characteristic of the invention, the portion of the pipe that is covered in the material of the overmolded block includes means for adhering to said material or for anchoring in said material, for example an adhesive film, a flat, fluting, knurling, a projecting element, etc. . . . .

This ensures that the pipe is prevented from moving in translation or in rotation relative to the overmolded block.

Similarly, the portion of the fixing tab which is embedded in the overmolded block includes means for anchoring in the material of the block, for example holes, orifices, cavities, grooves, or bends.

The invention applies to the motor industry, as mentioned above, and also to building, domestic electrical appliances, the chemical industry, and to any other field where there is a need to fix together a rigid support and fluid pipes that are liable to generate noise and vibration.

BRIEF DESCRIPTION OF THE DRAWING

The invention will be better understood and other characteristics, details, and advantages thereof will appear more clearly on reading the following description, given by way of example and made with reference to the accompanying drawing, in which.

MORE DETAILED DESCRIPTION

Figure 1:
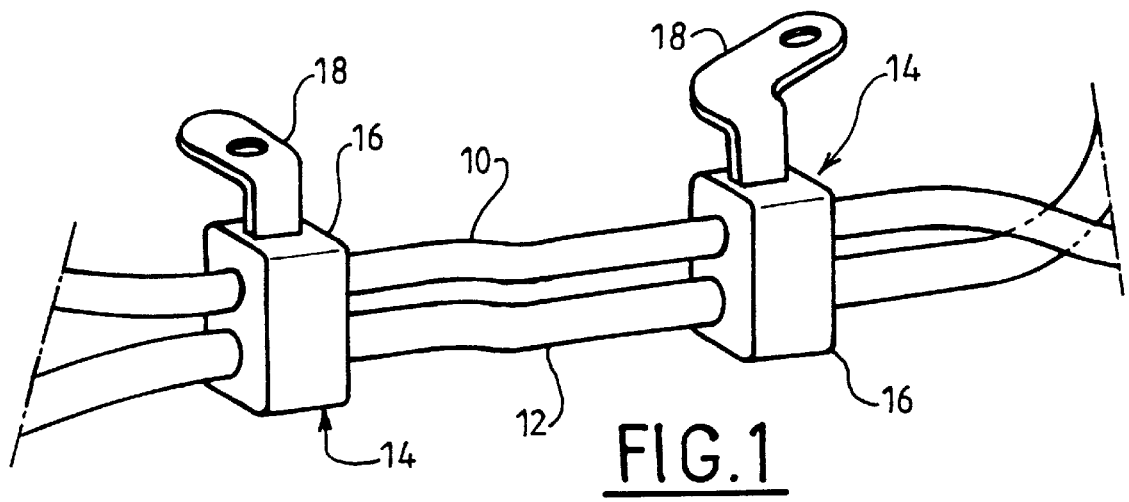
FIG. 1 is a diagram showing two pipes fitted with fixing devices of the invention.

Reference is made initially to FIG. 1 which is a diagram showing two pipes 10 and 12 such as a high pressure pipe and a low pressure pipe in the power steering circuit of a motor vehicle, the pipes being fitted with two fixing devices of the invention given overall reference 14 and enabling the pipes 10 and 12 to be fixed to a common support (not shown in FIG. 1) and to be held relative to each other in predetermined positions, it being possible for these two pipes to have diameters that are identical or different, and for them to be substantially parallel over a portion of their length, as shown in FIG. 1, after which they may go in different directions.

Figure 2:
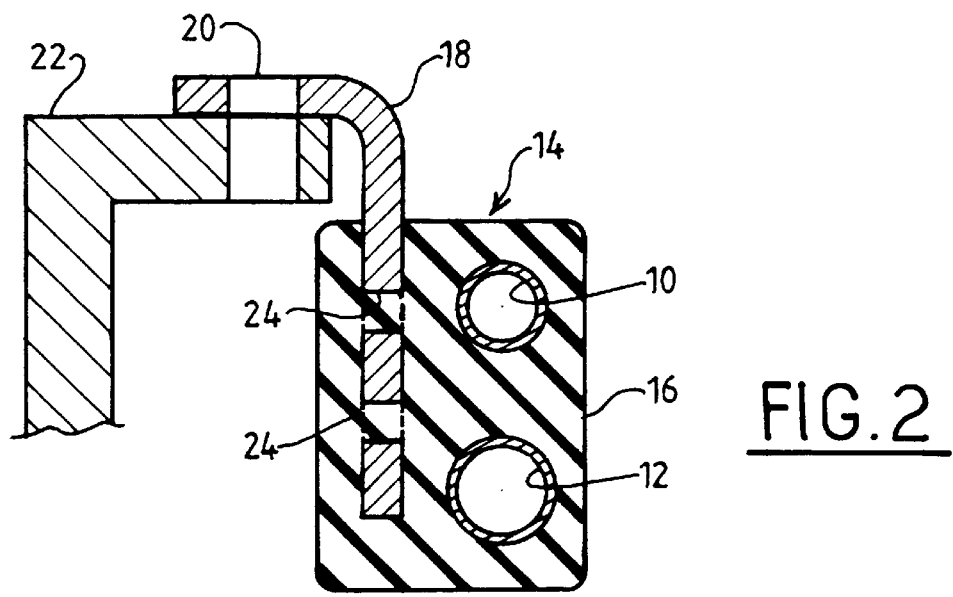
FIG. 2 is a diagrammatic cross-section view on a larger scale through a fixing device of the invention.
Figure 3:
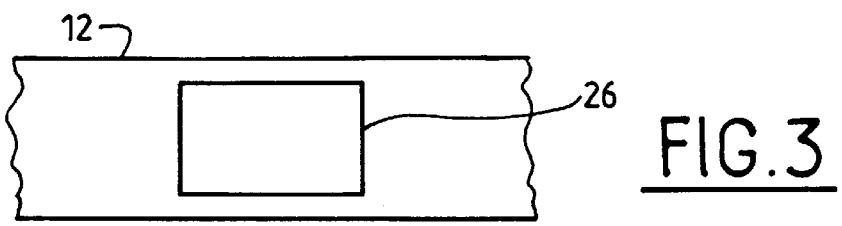
FIG. 3 is a fragmentary diagrammatic view of a pipe including means for anchoring in the overmolded block.

Each fixing device 14 is essentially constituted (FIG. 2) by a block 16 of an elastically deformable material such as rubber or an elastomer, which block completely covers the pipes 10 and 12 while keeping them at a predetermined distance apart and in a determined orientation relative to each other, with the block also covering a portion of a fixing tab 18 whose other portion projects outside the block 16 and, for example, includes an orifice 20 for receiving a screw or a bolt for fixing to the support 22 (the tab 18 can be fixed to the support 22 by any appropriate means known in the art).

The portion of the tab 18 which is embedded in the block 16 is at a distance from the pipes 10 and 12, and it is separated therefrom by sufficient thickness of material to prevent, or at least very greatly reduce, the transmission of vibration and noise that may be generated in the pipes 10 and 12 to the support 22.

The block 16 thus constitutes simultaneously means for fixing the tab 18 to the pipes 10 and 12, means for linking the two pipes together, and a filter against noise and vibration, while also making it possible, by elastic deformation, for the pipes to move a small amount relative to the support 22, thereby relaxing manufacturing tolerances on the block 16 and the tab 18, and also relaxing assembly tolerances for the pipes in a relatively constricted space such as the engine compartment of a motor vehicle.

The fixing tab 18 includes means for anchoring it in the overmolded block 16, which means may take a very wide variety of shapes, however in the example shown they are constituted merely by orifices 24 which are filled with the material of the block 16 while the block is being overmolded.

It is also possible to provide cavities, grooves, bends, etc. in the tab 18 that also serve for anchoring the tab 18 in the block 16 and preventing it from moving relative thereto.

Similarly, means are preferably provided for preventing the pipes 10 and 12 from moving in translation or rotation in the block 16, which means comprise, for example, one or more flats 26 formed in the outside surfaces of the pipes 10 and 12, or else fluting, knurling, bulges, etc. . . . . .

It is also possible to place a film of suitable adhesive on the portions of the pipes 10 and 12 that are to be embedded in the material of the block 16.

The fixing tabs described are made of metal, but more generally they could also be made of a suitable synthetic or plastics material.

The overmolded blocks 16 are made of rubber or of an elastomer such as neoprene, a butyl rubber, an EPDM, or the like.

Fixing devices of the invention are simple to manufacture:

It suffices to make a small overmolding mold having the shape of the block 16 and including means for positioning the pipes 10 and 12 and the fixing tab 18.

The device of the invention has numerous advantages over the prior art:

- the cost of making an overmolding mold is much less than that of the tooling used for brazing tabs onto metal pipes;
- the configuration of the fixing tabs is simplified (at least concerning the portion embedded in the overmolded block 16);
- the tabs 18 can be made of a material that is different from the material of the pipes 10 and 12;
- the tabs 18 can be fixed to a rigid support, e.g. made of metal, without any risk of transmitting the noise and vibration generated in the pipes;
- pipes of different kinds and of different diameters can be connected together;
- the fixing device can be used to space the pipes apart and to define their relative orientation; and
- the overmolded blocks 16 are more compact and of smaller volume than the means known in the prior art.

I claim:

1. An assembly comprising:

(a) at least one fluid pipe;

(b) a block comprising an elastomeric material overmolded on a portion of the at least one pipe; and (c) a mounting unit for attaching the at least one pipe to a rigid support, said mounting unit comprising at least one fixing tab having (i) an anchor portion which is embedded in the block such that the fixing tab is spaced apart from the pipe, and (ii) a fixing portion which is located outside and spaced from the block, said fixing portion allowing direct attachment of the fixing tab to a rigid support.

2. The assembly according to claim 1 wherein the anchor portion of said fixing tab includes means for anchoring the fixing tab in the block.

3. The assembly according to claim 2 wherein the anchoring means is a hole, cavity, groove or bend in the anchoring portion.

4. The assembly according to claim 1 wherein the portion of the pipe which is overmolded by said block includes means for adhering the pipe to the block.

5. The assembly according to claim 4 wherein the means for adhering comprises an adhesive film.

6. The assembly according to claim 4 wherein the portion of the pipe has a flat, a fluting or a knurling on the surface thereof.

7. The assembly according to claim 1 wherein the fixing tab comprises a metal material.

8. The assembly according to claim 1 wherein the fixing tab comprises a plastic material.

9. The assembly according to claim 1 wherein the assembly includes at least two pipes and the block is overmolded on a portion of the pipes.

10. The assembly according to claim 9 wherein the at least two pipes are at least substantially parallel to each other.

11. The assembly according to claim 1 wherein the pipe is a metal pipe.

12. The apparatus according to claim 11 wherein the metal pipe is a hydraulic fluid pipe.

13. The assembly according to claim 1 wherein the rigid support is a metal support.

14. The assembly according to claim 13 wherein the metal support is a portion of a motor vehicle.

15. The assembly according to claim 1 wherein the at least one pipe is a pipe for a motor vehicle selected from a group consisting of air conditioning pipes, fuel pipes, brake pipes, and oil pipes.

* * * * *

UNITED STATES PATENT AND TRADEMARK OFFICE
CERTIFICATE OF CORRECTION

PATENT NO. : 5,957,415
DATED : September 28, 1999
INVENTOR(S) : Perea

It is certified that error appears in the above-identified patent and that said Letters Patent is hereby corrected as shown below:

Title page:

[30] Foreign Application Priority Data, "Dec. 22, 1996" should read --Dec. 12, 1996--.

[56] References Cited, U.S. PATENT DOCUMENTS, line 6, "Porbst" should read --Probst--.

Signed and Sealed this

Eleventh Day of January, 2000

Attest:

Q. TODD DICKINSON

*Attesting Officer*    *Acting Commissioner of Patents and Trademarks*